US006795537B1

(12) United States Patent
Gilbert

(10) Patent No.: US 6,795,537 B1
(45) Date of Patent: Sep. 21, 2004

(54) METHOD FOR UPDATING A DATABASE USING A TELEPHONE

(75) Inventor: Lanny Gilbert, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/474,019

(22) Filed: Dec. 28, 1999

(51) Int. Cl.[7] .............................................. H04M 11/00
(52) U.S. Cl. ................................ 379/93.25; 379/201.02
(58) Field of Search ........................... 379/93.25, 93.26, 379/88.17, 93.12, 201.02

(56) References Cited

U.S. PATENT DOCUMENTS 5,038,374 A * 8/1991 Kaufman et al. ........ 379/93.25
6,122,351 A * 9/2000 Schlueter et al. ...... 379/106.02
6,323,894 B1 * 11/2001 Katz ........................ 348/14.08
6,327,346 B1 * 12/2001 Infosino ................... 379/201.1
6,370,139 B2 * 4/2002 Redmond .................... 370/354
6,393,017 B1 * 5/2002 Galvin et al. ............... 370/352
6,571,245 B2 * 5/2003 Chun et al. ................... 707/10

* cited by examiner

*Primary Examiner*—Ahmad F. Matar
*Assistant Examiner*—Quynh H. Nguyen
(74) *Attorney, Agent, or Firm*—Shaw Pittman LLP

(57) ABSTRACT

A system for and method of updating a database over a telephone network wherein a caller enters a number and the database is searched for that number. If the entered number is found as an entry in the database, that entry is deleted from the database. If the entered number is not found to be an entry in the database, the entered number is then added to the database as a new entry. The caller is given an opportunity to confirm whether the entered number should be deleted or added, as the case may be. Interactive voice response may be implemented to aid a caller through the simplified database updating process.

10 Claims, 3 Drawing Sheets

METHOD FOR UPDATING A DATABASE USING A TELEPHONE

BACKGROUND

1. Field of the Invention

The present invention relates generally to databases, and more particularly to simplified database updating using a telephone system.

2. Background of the Invention

Computer databases are used in many disciplines to store information related to, for example, consumers, inventory, scientific data and the services industries. It is often desirable to access the data stored in a particular database to update the data so that it is accurate for use as reference information for other applications. Specifically, it is often desirable to access a database for the purpose of deleting an item or adding an item.

Accessing data stored in a database can be performed either directly or indirectly. In the direct case, the stored data is accessed by opening a file in which the desired data is stored, the data is modified using, e.g., a text editor via a keyboard or mouse of a computer system, and an updated version of the data is stored. This method is desirable when there is a small amount of data to be modified or entered, and a user has unlimited access to the files that comprise the database.

In the indirect case, there is no direct manipulation of the data files that comprise the database. Indirect manipulation might be practical where, for security reasons, one is not permitted direct access to the data files. Also, if the scope of the data entry or modification is such that the time required for individual data element entry or modification is unrealistic, indirect manipulation is desirable. Indirect manipulation can be accomplished by, for example, developing a software program, such as a macro programmed in the language of the database application itself, that accesses the data files and makes modifications thereto. It is also well known to write programs that will populate a database with predetermined data thereby avoiding having to enter each individual data element. In either the direct or indirect case, however, some knowledge of the data structures of the data files is necessary to properly update individual data elements or a plurality of data elements.

Further, it is often the case that the person charged with updating a database is not in the same location as is the computer system or storage medium on which the database resides. This adds yet another layer of complexity to the task of modifying a database. Thus, it is generally complicated to update information stored in a database.

SUMMARY OF THE INVENTION

In view of the database modifying difficulties described above, there is a need for a simple and efficient method for updating a database, even when the person making the changes to the database is not near the computer system on which the database is stored.

In accordance with the present invention, a database can be easily updated by supplying a number to a controller. The controller passes the number to the database and if the number is present in the database, the number is deleted. If, on the other hand, the number is not in the database, the number is added to the database.

More specifically, the present invention is a method of updating a database preferably using a telephone. A telephone call is placed to an access number which provides access to a database. The caller then enters a number to update the database. The number can be a telephone number, social security number or any other identification number. The database is then searched. If the entered number is found as an entry in the database, that entry is deleted from the database. On the other hand, if the entered number is not found to be an entry in the database, the entered number is then added to the database as a new entry. In a preferred embodiment of the invention, the caller is given an opportunity to confirm whether the entered number should be deleted or added, as the case may be. The present invention also contemplates the use of an interactive voice response system to aid a caller through the simplified database updating process.

The present invention thus provides a highly simplified method of updating a database wherein the user need not have any specialized knowledge of the data structure of the database files and also need not be in the same location as the database itself.

It is therefore an object of the present invention to provide a simple and rapid method of updating of a database.

It is a further object of the present invention to facilitate database updating via a telephone.

It is yet another object of the present invention to automatically update a database using a telephone with minimal instruction from the caller.

It is also an object of the present invention to update a database by adding entries to and deleting entries from the database.

DETAILED DESCRIPTION OF THE INVENTION

Figure 1:
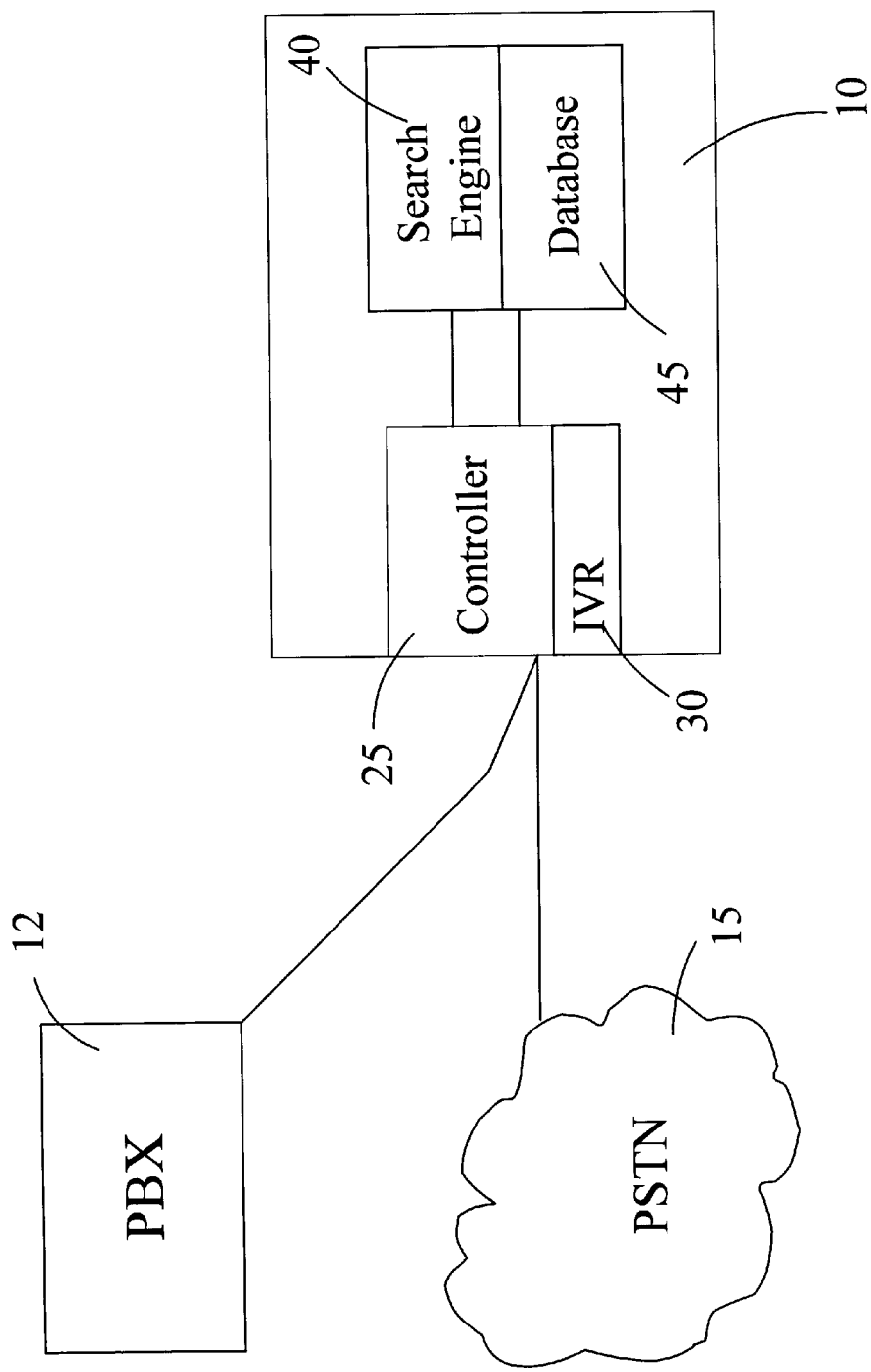
FIG. 1 is a schematic diagram of a preferred embodiment of the present invention.

The present invention will now be described in more detail with reference to the Figures. FIG. 1 is a schematic diagram of a preferred embodiment of the present invention wherein element 15 is a public switched telephone network (PSTN) and element 12 is a private branch exchange (PBX). As shown, both PSTN 15 and PBX 12 are connected to system 10, which encompasses the various components of the present invention. System 10 can be implemented with a general purpose computer or any other suitable electronically controlled system that provides the functionality described below. System 10 includes a controller 25 that is in communication with PBX 12 and PSTN 15, and a search engine 40 and a database 45. Controller 25 preferably also includes an interactive voice response (IVR) system 30, the function of which will be explained later herein.

Controller 25 operates to make telephone connections between system 10 and individual callers from PBX 12 or PSTN 15. Controller 25 further operates to communicate with search engine 40 and database 45 and is operable to add and delete single or multiple entries in database 45. When implemented, the IVR system 30 is arranged to (i) repeat back to a caller a number entered by a caller and/or (ii) announce predetermined messages to the caller. Controller 25 is implemented with conventional computer technology including memory and microprocessors and suitable input/output connections.

Figure 2:
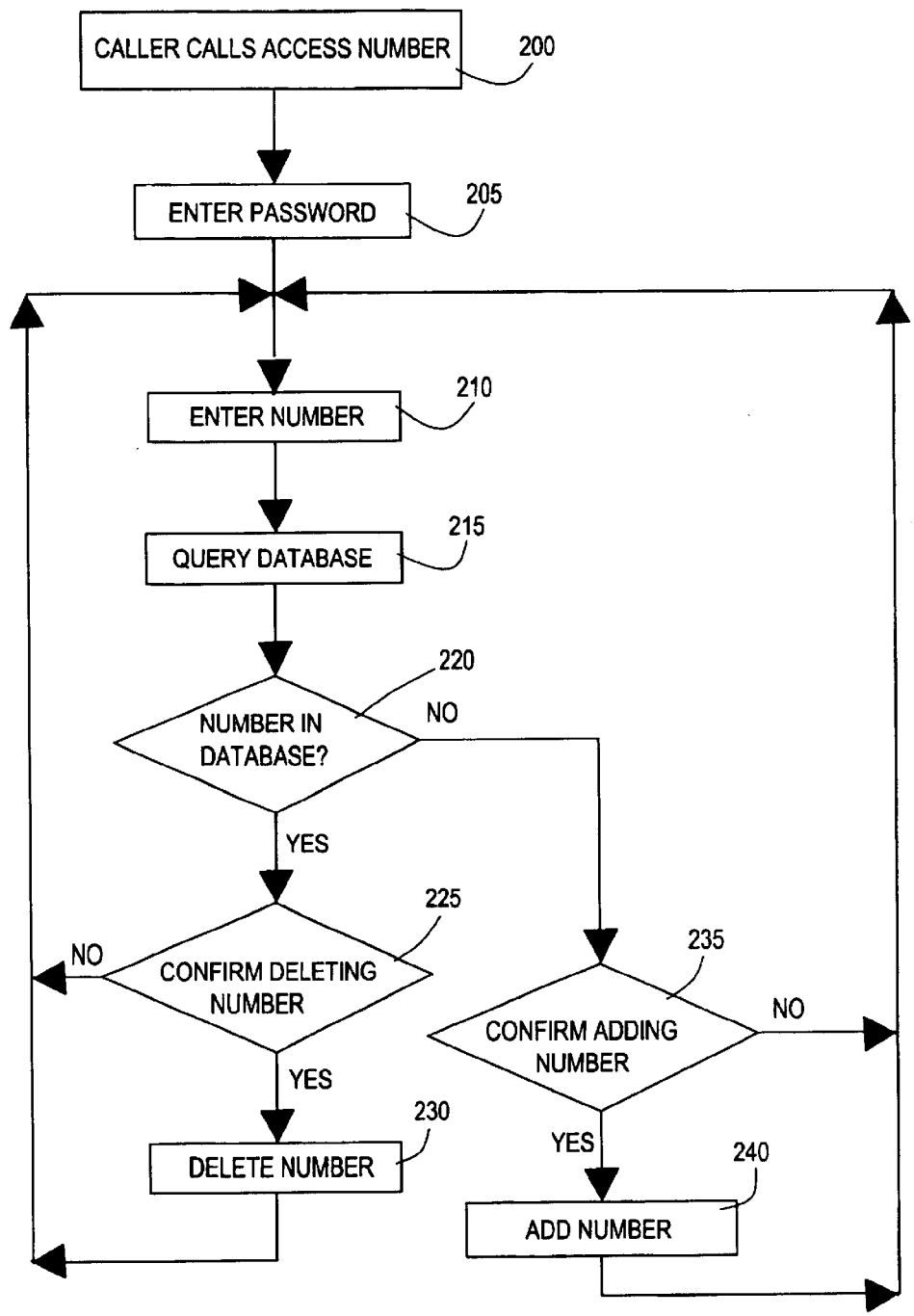
FIG. 2 is a flow diagram illustrating operation of a preferred embodiment of the present invention.

The operation of system 10 will now be explained with reference to FIG. 2. A caller calls an access number in step 200 to access system 10. At that point, the caller preferably enters a password at step 205. The password is used to verify that the caller is authorized to effect modifications to database 45. Next, at step 210, the caller enters a number or information represented by numeric data that is to be added or deleted from database 45. Accordingly, the number entered preferably is in a form corresponding to at least one data field in database 45. For example, in the case of a telephone number being entered, database 45 preferably includes a data field that has a 7 or 10 digit number.

At step 215, having received the entered number, the controller initiates a query of database 45 using search engine 40. Database 45 and search engine 40 can be implemented with any known database application software such as MICROSOFT ACCESS™ or ORACLE™. Where appropriate, the database can be implemented with hardware such as DRAM integrated circuits. If a match is made, that is, if the entered number is in database 45 (step 220) then the caller is given the opportunity at step 225 to confirm deletion of that number from database 45. If confirmation is positive by, for example, pressing "*" on the telephone keypad, the entry in database 45 matching the entered number is deleted and controller 25 returns the caller to step 210. If, on the other hand, confirmation at step 225 is negative, the entry in database 45 is not deleted and the caller is returned to step 210.

Since it is often the case that a particular data element is associated with a larger group of elements, commonly known as a record, the present invention also provides for deleting all or a portion of that record from database 45. This functionality may be desirable where it is no longer necessary to retain a record if one of the data elements has been deleted. This functionality leads to improved system memory capacity as well.

If it is determined at step 220 that the entered number is not in database 45, then the caller preferably is given the opportunity to add that number as an entry to database 45. Specifically, at step 235, the caller is asked to confirm adding the entered number as an entry, and if confirmation is positive, i.e., the caller presses a "1" on the telephone keypad, the number is entered in database 45 at step 240 and the caller is thereafter returned to step 210. If confirmation is negative at step 235, the caller is immediately returned to step 210.

In the preferred embodiment, interactive voice response system 30 is used to read back the entered number or numeric information and/or prompt the caller or user of system 10 with respect to (i) confirming the actions of adding or deleting, (ii) entering a password, and (iii) entering the numeric information that is to be searched. However, the IVR system 30 is an optional component of the present invention, which may not be needed, for example, in view of telephone systems having digital readouts for numbers entered via the keypad of the telephone.

Thus, it can be seen from the foregoing description that the present invention provides a simplified database updating method and system that adds and deletes entries in a database by querying the database for a number entered by telephone and if the entered number is matched with an entry in the database, automatically deleting that entry, and if the entered number is not found, automatically adding that number to the database as an entry.

The number itself can be a telephone number, social security number, or any other personal identification or service number that might be stored in a database.

An example of a use of the present invention is as follows. A service person completing a job at a customer's home can call the access number of the service provider's company and enter the customer's phone number. The database, having previously been loaded with the telephone numbers of all customers having service scheduled for that particular day, would be automatically updated by deleting that customer from the list of customers that are still in need of service on that day. The record associated with that telephone number may also be deleted whereby the reason for the service call, which was previously entered in the database, is also deleted. Thus, the service provider company can obtain quick and accurate information regarding the remaining service calls for that day. Use of the present invention, however, is not limited to service provider scenarios and this example is provided for explanation purposes only.

Finally, it is noted that system 10 can be implemented in a number of different places. For example, system 10 can reside at a service provider's headquarters or at its field offices. As long as the access number is known by those who intend to use the system, the location of apparatus 10 is not limited.

Figure 3:
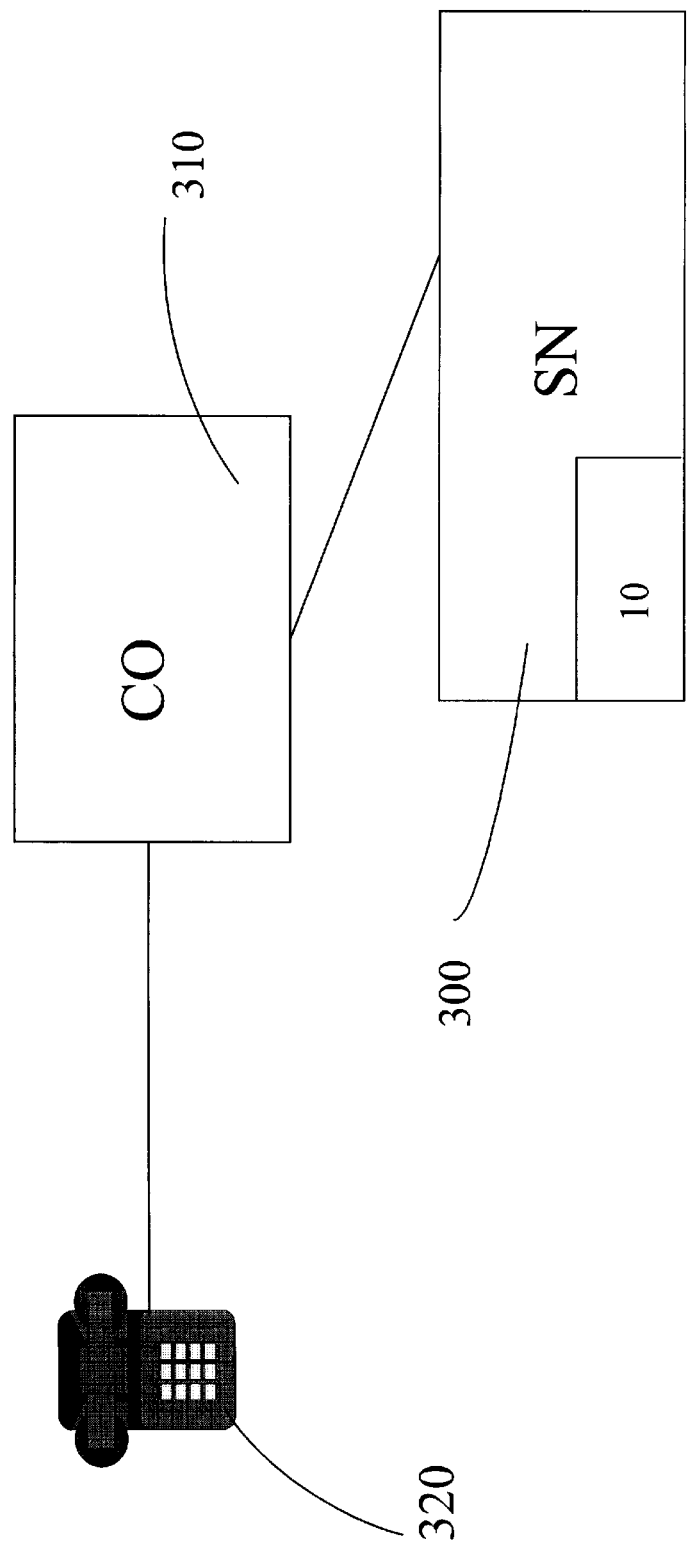
FIG. 3 illustrates an embodiment of the present invention deployed on service node in the public switched telephone network.

In another implementation, the service provider could be the telephone company itself. In this case, system 10 could reside on a service node (SN) 300 of the telephone network that is connected to a central office (CO) 310, which itself provides telephone connectivity for a caller at location 320, as shown in FIG. 3. An example of the use of this implementation is as follows. A telephone user would like to have a service representative of the telephone company call. The telephone user calls a service or access number. The CO 310 routes that call to SN 300 where system 10 is deployed. The user then enters his telephone number. Since the number is not in database 45 it is added thereto. The telephone company can then, based on the database that is continuously being updated by customers, periodically compile a service request list. If the telephone user subsequently decides to cancel his request, he need only call the access number and enter his telephone number, thereby automatically removing his telephone number from database 45 and the telephone company's subsequently generated service request list.

Thus it is readily seen that the method and system of the present invention provide a simple alternative for quickly updating a database.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method of updating a database, comprising:
   receiving a data element over a telecommunications network, the data element being input to the telecommunications network via a telephone call to effect database updating;
   determining whether said data element is in the database by querying the database and attempting to match the data element with an entry in the database;

deleting said data element from the database if said data element is in the database; and adding said data element to the data base if said data element is not in the database.

2. The method of claim 1, further comprising prompting a user to confirm whether to delete or add said data element.

3. The method of claim 1, wherein the data element is one of a telephone number, a personal identification number and a social security number.

4. A method of updating a database via a telephone system, comprising the steps of:

calling, over a telephone line, from a first location an access number that provides access to the database, the database being located at a second location different from the first location;

sending from the first location, via the telephone system, a number that is in a form corresponding to at least one data field in said database;

querying said database in an attempt to match said sent number to an entry previously stored in said database; and deleting said previously stored entry from said database when a match between said number and said previously stored entry is found.

5. The method of claim 4, further comprising deleting at least a portion of an entire record associated with said entry.

6. The method of claim 4, further comprising adding to the database said number as an entry if no match is found.

7. The method of claim 4, further comprising employing interactive voice response to read back said number.

8. A method of updating a database via telephone, comprising the steps of:

receiving a number entered into the public switched telephone network at a first location after dialing an access number that results in providing access to the database;

querying the database for said number, the database being at a second location; and automatically updating the database with said number if said number is not found in the database, and automatically deleting said number from the database if said number is found in the database, wherein the number is at least one of a telephone number, an inventory control number, a social security number and a personal identification number.

9. The method of claim 8, further comprising providing confirmation with respect to said updating or deleting step, wherein the confirmation step is effected with the use of an interactive voice response system.

10. The method of claim 8, further comprising obtaining access to the database via a password.

* * * * *